US011308948B2

(12) United States Patent
Zhang et al.

(10) Patent No.: US 11,308,948 B2
(45) Date of Patent: Apr. 19, 2022

(54) INTELLIGENT INTERACTION PROCESSING METHOD AND APPARATUS, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Mengmeng Zhang, Beijing (CN); Gang Zhang, Beijing (CN); Li Wan, Beijing (CN); Jia Liu, Beijing (CN); Xiangtao Jiang, Beijing (CN); Ran Xu, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 177 days.

(21) Appl. No.: 16/174,087

(22) Filed: Oct. 29, 2018

(65) Prior Publication Data
US 2019/0147871 A1 May 16, 2019

(30) Foreign Application Priority Data
Nov. 16, 2017 (CN) .......................... 201711138632.4

(51) Int. Cl.
*G06F 16/33* (2019.01)
*G06F 16/00* (2019.01)
(Continued)

(52) U.S. Cl.
CPC ............ *G10L 15/22* (2013.01); *G06F 40/216* (2020.01); *G06F 40/274* (2020.01);
(Continued)

(58) Field of Classification Search
CPC .......... G10L 15/08; G10L 17/22; G10L 15/22
See application file for complete search history.

(56) References Cited

U.S. PATENT DOCUMENTS 10,418,032 B1 * 9/2019 Mohajer .................. G10L 15/22
10,664,504 B2 * 5/2020 Chen .................... G06F 16/3329
(Continued)

FOREIGN PATENT DOCUMENTS

| CN | 105138671 A | 12/2015 |
|---|---|---|
| CN | 105426436 A | 3/2016 |

(Continued)

OTHER PUBLICATIONS

First Office Action and search report from CN app. No. 201711138632. 4, dated Mar. 5, 2019, with English translation from Global Dossier.

(Continued)

*Primary Examiner* — Olujimi A Adesanya
(74) *Attorney, Agent, or Firm* — Ladas & Parry, LLP

(57) ABSTRACT

The present disclosure provides an intelligent interaction processing method and apparatus, a device and a computer storage medium. The method comprises: performing intention recognition for a preceding feedback item already returned to the user; continuing to return a subsequent feedback item to the user based on the intention of the preceding feedback item. According to the present disclosure, it is possible to guess the user's subsequent intention based on the preceding feedback item, and continue to return the desired subsequent feedback item to the user without the user's operations, so that the present disclosure is more intelligentized and richer and simplifies the user's operations.

16 Claims, 3 Drawing Sheets

(51) Int. Cl.
*G10L 15/22* (2006.01)
*G10L 15/18* (2013.01)
*G06N 20/00* (2019.01)
*G06F 40/30* (2020.01)
*G06F 40/35* (2020.01)
*G06F 40/216* (2020.01)
*G06F 40/274* (2020.01)
*G06F 40/284* (2020.01)

(52) U.S. Cl.
CPC ............ *G06F 40/284* (2020.01); *G06F 40/30* (2020.01); *G06F 40/35* (2020.01); *G06N 20/00* (2019.01); *G10L 15/1815* (2013.01); *G10L 15/1822* (2013.01); *G10L 2015/225* (2013.01)

(56) References Cited

U.S. PATENT DOCUMENTS

| | | | | |
|---|---|---|---|---|
| 2004/0193420 | A1* | 9/2004 | Kennewick | G06F 16/3329 704/257 |
| 2007/0033005 | A1* | 2/2007 | Cristo | G10L 15/19 704/9 |
| 2007/0050191 | A1* | 3/2007 | Weider | G10L 21/06 704/275 |
| 2008/0091406 | A1* | 4/2008 | Baldwin | G10L 25/51 704/4 |
| 2011/0246910 | A1* | 10/2011 | Moxley | G06Q 30/02 707/706 |
| 2013/0275164 | A1* | 10/2013 | Gruber | G06Q 10/02 705/5 |
| 2014/0310001 | A1* | 10/2014 | Kains | G10L 15/32 704/270.1 |
| 2015/0142704 | A1* | 5/2015 | London | G06N 5/022 706/11 |
| 2016/0321347 | A1* | 11/2016 | Zhou | G06Q 30/0621 |
| 2017/0032791 | A1* | 2/2017 | Elson | G10L 17/22 |
| 2018/0336266 | A1* | 11/2018 | Chen | G06N 3/02 |
| 2019/0057157 | A1* | 2/2019 | Mandal | G06F 16/3329 |
| 2020/0143115 | A1* | 5/2020 | Brigham | G06N 3/006 |

FOREIGN PATENT DOCUMENTS

| | | |
|---|---|---|
| CN | 105512228 A | 4/2016 |
| CN | 105554139 A | 5/2016 |
| CN | 106126516 A | 11/2016 |
| CN | 107015964 A | 8/2017 |
| JP | 2002163171 A | 6/2002 |

OTHER PUBLICATIONS

Decision of Rejection from CN app. No. 201711138632.4, dated Jul. 2, 2019, with English translation from Global Dossier.
Notice of Reasons for Refusal from JP app. No. 2018-210599, dated Oct. 25, 2019, with English translation from Global Dossier.
Notice of Reasons for Refusal from JP app. No. 2018-210599, dated Apr. 20, 2020, with English translation from Global Dossier.

* cited by examiner

INTELLIGENT INTERACTION PROCESSING METHOD AND APPARATUS, DEVICE AND COMPUTER STORAGE MEDIUM

The present application claims the priority of Chinese Patent Application No. 201711138632.4, filed on Nov. 16, 2017, with the title of "Intelligent interaction processing method and apparatus, device and computer storage medium". The disclosure of the above applications is incorporated herein by reference in its entirety.

FIELD OF THE DISCLOSURE

The present disclosure relates to the technical field of computer application, and particularly to an intelligent interaction processing method and apparatus, a device and a computer storage medium.

BACKGROUND OF THE DISCLOSURE

As mobile network and cloud computing develop rapidly, smart assistant type applications particularly speech assistants have already been applied to diverse user equipment such as mobile phones, smart TV sets and smart loudspeaker boxes. They, through intelligent dialogue and intelligent interaction of instant question and answer, return the user various information that the user wants to know, even set applications and control other user equipment.

After obtaining the user's query, a conventional smart assistant returns a single feedback item to the user. For example, when the user inputs "when is the latest match of Manchester United", the smart assistant returns "the latest match of Manchester United is at 05:00 Nov. 2, 2017, and the opponent is Arsenal". If the user wants to operate subsequently or obtain subsequent information, he needs to further input a query. Again for example, when the user inputs the query "good morning", the feedback item returned by the smart assistant is information about today's weather. When the user usually continues to want to know information about today's road conditions, he needs to continue to input the query "what about today's road conditions". Obviously, intelligentization and richness is insufficient, and operations are complicated.

SUMMARY OF THE DISCLOSURE

In view of the above, the present disclosure provides an intelligent interaction processing method and apparatus, a device and a computer storage medium, to improve intelligentization degree and richness of intelligent interaction and simplifies the user's operations.

Specific Technical Solutions are as Follows:

The present disclosure provides an intelligent interaction processing method, the method comprising:

performing intention recognition for a preceding feedback item already returned to the user;

continuing to return a subsequent feedback item to the user based on the intention of the preceding feedback item.

According to a specific implementation mode of the present disclosure, the returning a subsequent feedback item to the user based on the intention of the preceding feedback item comprises:

determining a type of the subsequent feedback item corresponding to the intention;

obtaining an entity of the subsequent feedback item;

using the entity of the subsequent feedback item and the type of the subsequent feedback item to determine the subsequent feedback item returned to the user.

According to a specific implementation mode of the present disclosure, the performing intention recognition for a preceding feedback item already returned to the user comprises:

extracting a keyword from the preceding feedback item, and determining an intention of the preceding feedback item according to the keyword; or, performing semantic analysis for the preceding feedback item, and determining the intention of the preceding feedback item; or matching the preceding feedback item with a preset template, and determining an intention corresponding to the matched template as the intention of the preceding feedback item; or using a machine learning model obtained by pre-training to perform intention analysis for the preceding feedback item to obtain an intention of the preceding feedback item.

According to a specific implementation mode of the present disclosure, the determining a type of the subsequent feedback item corresponding to the intention comprises:

determining the type of the subsequent feedback item corresponding to the recognized intention, according to a correspondence relationship between the preset intention and the type of the subsequent feedback item.

According to a specific implementation mode of the present disclosure, the correspondence relationship further comprises: a type of preceding feedback item;

the method further comprises: determining the type of the preceding feedback item already returned to the user;

the determining a type of the subsequent feedback item corresponding to the recognized intention, according to a correspondence relationship between the preset intention and the type of the subsequent feedback item comprises:

determining the corresponding type of the subsequent feedback item according to the correspondence relationship between the type of the preceding feedback item and the intention query of the preceding feedback item.

According to a specific implementation mode of the present disclosure, before determining the type of the subsequent feedback, item corresponding to the intention, the method further comprises:

judging whether an intention confidence of the preceding feedback item satisfies a preset confidence requirement, and if yes, continuing to execute of the determination of the type of the subsequent feedback item corresponding to the intention.

According to a specific implementation mode of the present disclosure, the type of the subsequent feedback item corresponding to the recognized intention is determined further based on the user's environment information.

According to a specific implementation mode of the present disclosure, the user's environment information comprises at least one of system time, user equipment type and user equipment action.

According to a specific implementation mode of the present disclosure, the obtaining the entity of the subsequent feedback item comprises:

regarding an entity extracted from the preceding feedback item as an entity of the subsequent feedback item: or obtaining an entity from user data or user environment information as an entity of the subsequent feedback item.

According to a specific implementation mode of the present disclosure, the using the entity of the subsequent feedback item and the type of the subsequent feedback item to determine the subsequent feedback item comprises:

using the entity of the subsequent feedback item and the type of the subsequent feedback item to configure a search item;

obtaining a vertical search result corresponding to the search item as the subsequent feedback item.

According to a specific implementation mode of the present disclosure, the using the entity of the subsequent feedback item and the type of the subsequent feedback item to configure a search item comprises:

determining a template corresponding to the type of the subsequent feedback item;

filling the entity of the subsequent feedback item into the determined template to obtain the search item.

According to a specific implementation mode of the present disclosure, the using the entity of the subsequent feedback item and the type of the subsequent feedback item to determine the subsequent feedback item comprises:

using the entity of the subsequent feedback item and the type of the subsequent feedback item to generate a control instruction;

sending the control instruction to an application or user equipment corresponding to the type of the subsequent feedback item.

According to a specific implementation mode of the present disclosure, the returning the subsequent feedback item to the user comprises:

directly returning the determined subsequent feedback item to the user; or determining whether to return the determined subsequent feedback item to the user based on the user's feedback.

According to a specific implementation mode of the present disclosure, transition wording is returned between the preceding feedback item already returned to the user and the subsequent feedback item returned to the user;

the transition wording comprises a general-purpose word or sentence, blank, symbol, shadow or audio.

According to a specific implementation mode of the present disclosure, the subsequent feedback item comprises text, audio, video, image, link, and a control event of an application or user equipment.

The present disclosure further provides an intelligent interaction processing apparatus, the apparatus comprising:

an intention recognizing unit configured to perform intention recognition for a preceding feedback item already returned to the user;

a subsequent feedback unit configured to return a subsequent feedback item to the user based on the intention of the preceding feedback item.

According to a specific implementation node of the present disclosure, the subsequent feedback unit specifically comprises:

a type determining unit configured to determine a type of the subsequent feedback item corresponding to the intention, based on the intention of the preceding feedback item.

an entity obtaining unit configured to obtain an entity of the subsequent feedback item;

a feedback item determining unit configured to use the entity of the subsequent feedback item and the type of the subsequent feedback item to determine the subsequent feedback item;

a feedback item returning unit configured to return the determined subsequent feedback item to the user.

According to a specific implementation mode of the present disclosure, the intention recognizing unit specifically performs:

extracting a keyword from the preceding feedback item, and determining an intention of the preceding feedback item according to the keyword; or, performing semantic analysis for the preceding feedback item, and determining the intention of the preceding feedback item; or matching the preceding feedback item with a preset template, and determining an intention corresponding to the matched template as the intention of the preceding feedback item; or using a machine learning model obtained by pre-training to perform intention analysis for the preceding feedback item to obtain an intention of the preceding feedback item.

According to a specific implementation mode of the present disclosure, the type determining unit specifically performs:

determining the type of the subsequent feedback item corresponding to the recognized intention, according to a correspondence relationship between the preset intention and the type of the subsequent feedback item.

According to a specific implementation mode of the present disclosure, the type determining unit determines the type of the subsequent feedback item corresponding to the recognized intention further based on the user's environment information.

According to a specific implementation mode of the present disclosure, the entity obtaining unit specifically performs:

regarding an entity extracted from the preceding feedback item as an entity of the subsequent feedback item; or obtaining an entity from user data or user environment information as an entity of the subsequent feedback item.

According to a specific implementation mode of the present disclosure, the feedback item determining unit specifically performs:

using the entity of the subsequent feedback item and the type of the subsequent feedback item to configure a search item; obtaining a vertical search result corresponding to the search item as the subsequent feedback item; or using the entity of the subsequent feedback item and the type of the subsequent feedback item to generate a control instruction; sending the control instruction to an application or user equipment corresponding to the type of the subsequent feedback item.

According to a specific implementation mode of the present disclosure, the subsequent feedback unit specifically performs:

directly returning the determined subsequent feedback item to the user; or determining whether to return the determined subsequent feedback item to the user based on the user's feedback.

According to a specific implementation mode of the present disclosure, the subsequent feedback unit feeds back transition wording between the preceding feedback item already returned to the user and the subsequent feedback item returned to the user;

the transition wording comprises a general-purpose word or sentence, blank, symbol, shadow or audio.

The present disclosure further provides a device, comprising:

one or more processors;

a storage for storing one or more programs, when said one or more programs are executed by said one or more processors, said one or more processors are enabled to implement the method.

The present disclosure further provides a storage medium containing computer executable instructions, wherein the computer executable instructions, when executed by a computer processor, implement the above method.

As can be seen from the above technical solutions, according to the present disclosure, it is possible to continue to return the subsequent feedback item to the user based on the intention of the preceding feedback item, thereby guessing the user's subsequent intention, and continue to return the desired subsequent feedback item to the user without the user's operation, so that the present disclosure is more intelligentized and richer and simplifies the user's operations.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if is determined" or "if . . . (stated condition or event) is detected" may be construed as "when . . . is determined" or "responsive to determining" or "when . . . (stated condition or event) is detected" or "responsive to detecting (stated condition or event)".

A kernel idea of the present disclosure lies in performing intention recognition for a preceding feedback item already returned to the user, and consecutively returning a subsequent feedback item to the user based on the intention of the preceding feedback item, thereby guessing the user's subsequent intention and continuing to return the user the desired subsequent feedback item without the user's operation. The method according to the present disclosure will be described in detail below in conjunction with embodiments.

Figure 1:
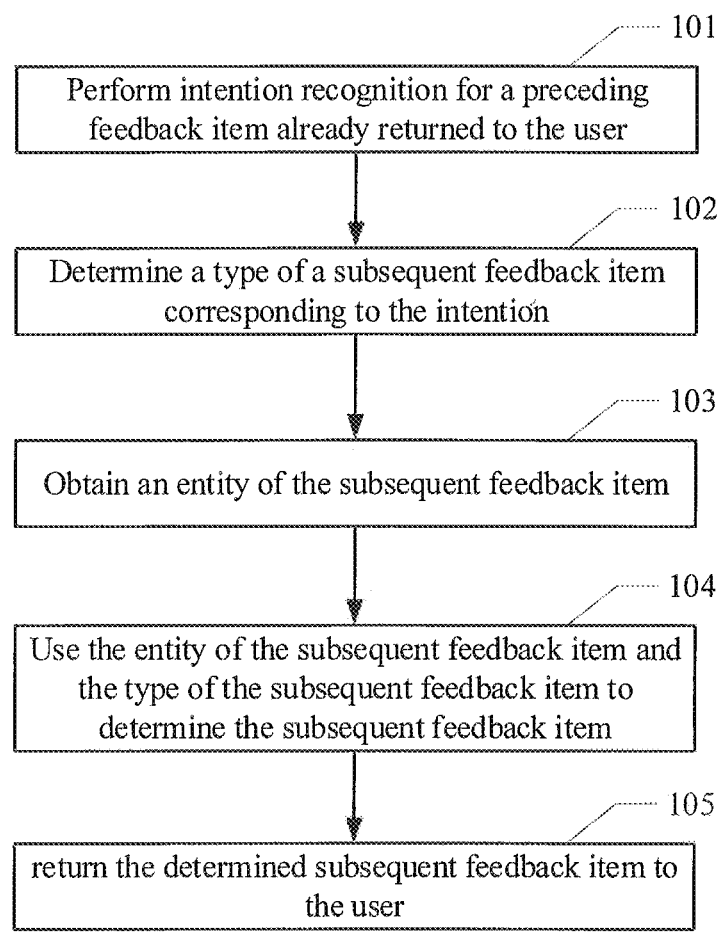
FIG. 1 is a flow chart of a method according to an embodiment of the present disclosure.

FIG. 1 is a flow chart of a method according to an embodiment of the present disclosure. As shown in FIG. 1, the method may mainly comprise the following steps:

At 101, perform intention recognition for a preceding feedback item already returned to the user.

In this step, the preceding feedback item already returned to the user may be the latest feedback item already returned to the user, or may be all feedback items already returned to the user based on the user's certain query. In the former case, it is feasible to perform intention recognition for the latest feedback item already returned to the user. In the latter case, it is feasible to perform overall intention recognition for all feedback items already returned to the user.

For example, assuming the user inputs the query "陈奕迅 (Eason Chan)", return the user a feedback item "Eason Chan encyclopedia" based on the query, and it is possible to execute the process of the present disclosure by regarding 【Eason Chan's encyclopedia】 as a preceding feedback item, and determine a subsequent feedback item 【Eason Chan's music list】. In next step, it is feasible to execute the process of the present disclosure by regarding 【Eason Chan's music list】 as the preceding feedback item and continue to determine a subsequent feedback item, or it is also feasible to execute the process of the present disclosure by regarding 【Eason Chan's encyclopedia】 and 【Eason Chan's music list】 jointly as the preceding feedback item and continue to determine a subsequent feedback item.

Specifically, the following manners may be employed upon performing intention recognition for the preceding feedback item. At present, there already exist relatively mature intention recognition manners. Several implementation modes are listed below, this is not limited to at least one of the following several implementation modes:

The first manner: extracting a keyword from the preceding feedback item, and determining an intention of the preceding feedback item according to the keyword.

In this manner: it is possible to preset keywords corresponding to various intention types, for example, "obtain a match result" corresponding to the keyword "match". It is possible, after obtaining the keyword from the preceding feedback item, determine the intention of the preceding feedback item based on the keyword, wherein one intention type may correspond to one or more keywords.

The second manner: performing semantic analysis for the preceding feedback item, and determining the intention of the preceding feedback item.

It is feasible to predefine a correspondence relationship between semantics and intention, and after performing semantic analysis for the preceding feedback item, determine an intention corresponding to the semantics as the intention of the preceding feedback item. The present embodiment of the present disclosure does not limit a specific manner of performing semantic analysis.

The third manner: matching the preceding feedback item with a preset template, and determining an intention corresponding to the matched template as the intention of the preceding feedback item.

It is feasible to preset templates corresponding to various intention, for example, an intention for setting the template "_____ match starts at _____" is "setting a reminder". If the preceding Feedback item is "the match between Manchester United and Arsenal starts at 20:00 Nov. 20, 2017", the preceding feedback item is matched with the above template and its intention is determined as "setting a reminder".

The fourth manner: using a machine learning model obtained by pre-training, and performing intention analysis for the preceding feedback item to obtain an intention of the preceding feedback item.

It is possible to pre-train the machine learning model by regarding feedback items whose intentions are annotated, as training samples. It is feasible to use the machine learning model obtained from training to perform intention analysis for the preceding feedback item to obtain an intention of the preceding feedback item.

At 102, determine a type of a subsequent feedback item corresponding to the intention.

In this step, it is possible to preset subsequent feedback item types corresponding to respective intentions. For example, a subsequent feedback type corresponding to the intention 【obtain a match result】 is 【a vertical search result of the match result】 or 【news of the match result】. Again for example, a subsequent feedback item type corresponding to 【set a reminder】 is 【control an alarm clock event】.

The correspondence relationship between the above intentions and subsequent feedback item types may be preset manually, or preset in the manner of machine learning.

In addition, in addition to depending on the intention of the preceding feedback item, the type of the subsequent feedback item may further be determined in conjunction with the type of the preceding feedback item and/or an intention confidence of the preceding feedback item.

For example, the pre-established correspondence relationship may be, the type of the preceding feedback item, and the type of the subsequent feedback item corresponding to the intention. That is to say, the type of the corresponding subsequent feedback item can be determined only when the type and intention of the preceding feedback item are hit simultaneously.

Again for example, the type of the corresponding subsequent feedback item can be determined only when the intention of the preceding feedback item needs to meet a certain confidence requirement. If the confidence is lower, it is impossible to continue to return the subsequent feedback item, namely, it is unnecessary to determine the subsequent feedback item.

In addition, the type of the subsequent feedback item may be further be determined based on the user's environment information.

The environment information may include at least one of system time, user equipment type and user equipment action. For example, if the preceding feedback item is "the match between Manchester United and Arsenal starts at 20:00 Nov. 20, 2017", when the system time is already later than the match time 20:00 Nov. 20, 2017, the subsequent feedback item should not be 【set a reminded】. Again for example, if the preceding feedback item is "宋小宝 (Xiaobao Song)" and if the current equipment type is a device having, a display screen such as a smart TV set or mobile phone, it is possible to determine the corresponding subsequent feedback item is 【Xiaobao Song's short sketch video】. Again for example, if the use equipment action is startup of a motor vehicle, it is possible to return the user relevant feedback, items such as road condition information, weather information, traffic restriction information and incompliance broadcast.

At 103, obtain an entity of the subsequent feedback item.

Manners of obtaining the entity of the subsequent feedback item according to the present step may employ but not limited to the following two manners:

The first manner: bring an entity from the preceding feedback item, namely, regard an entity extracted from the preceding feedback item as an entity of the subsequent feedback item. For example, if the preceding feedback item is "today's weather", the entity "today" therein may be regarded as the entity of the subsequent feedback item. Again for example, if the preceding feedback item is "the match between Manchester United and Arsenal starts at 20:00 Nov. 20, 2017", the entity "20:00 Nov. 20, 2017" therein may be regarded as the entity of the subsequent feedback item. In addition, in some cases, it is possible to perform concatenation processing for the entity extracted from the preceding feedback item, as the entity of the subsequent feedback item.

The second manner: bring an entity from the user data or user environment information, namely, obtain an entity from the user data or user environment information as the entity of the subsequent feedback item. For example, the subsequent feedback item is determined as 【road condition information】, it is possible to extract, from the user data, addresses of the user's home and company to return the road condition information, or obtain the user's current positioned address from the user environment information, to return the road condition information.

At 104, use the entity of the subsequent feedback item and the type of the subsequent feedback item to determine the subsequent feedback item.

Manners of determining the subsequent feedback item in the present step may include but not limited to the following two manners:

The first manner: use the entity of the subsequent feedback item and the type of the subsequent feedback item to configure a search item; obtain a vertical search result corresponding to the search item as the subsequent feedback item.

Upon configuring the search item, it is possible to determine a template corresponding to the type of the subsequent feedback item, and fill the entity of the subsequent feedback item into the determined template to obtain the search item.

For example, if the preceding feedback item is "today's weather", the entity "today" may be filled into the template "traffic restricted _____" to obtain the search item "traffic restricted today". Then, it is possible to use the search item "traffic restricted today" to perform vertical searching to obtain that the search result of "traffic restricted today" is "vehicles with tail digits 2 and 7 restricted today", and regard it as the subsequent feedback item.

Again for example, if the preceding feedback item is "Eason Chan encyclopedia", the entity "Eason Chan" may be filled into the template "_____song" to obtain the search item "Eason Chan song". Then, it is feasible to use the search item "Eason Chan song" to perform vertical search, and obtain a search result of "Eason Chan song" is a link list of Eason Chan's songs, or is audio resources of Eason Chan's songs.

The second manner: use the entity of the subsequent feedback item and the type of the subsequent feedback item to generate a control instruction; send the control instruction to an application or user equipment corresponding to the type of the subsequent feedback item.

For example, if the preceding feedback item is "the match between Manchester United and Arsenal starts at 20:00 Nov. 20, 2017", it is possible to combine the entity "20:00 Nov. 20, 2017" therein with "set a reminder" to generate a control instruction "set a reminder of 20:00 Nov. 20, 2017", and then send it to an alarm clock or reminder-type application, or to an alarm clock device.

At 105, return the determined subsequent feedback item to the user.

The determined subsequent feedback item may be returned directly to the user, or whether to return to the user may be determined based on the user's feedback. For example, assuming the subsequent feedback item "set a reminder of 20:00 Nov. 20, 2017" is generated, the user may be prompted of whether to set the reminder. If the user chooses to set, a reminder is set, and successful setting of the reminder is returned. Again for example, assuming that the subsequent feedback item "Eason Chan's song resources" is generated, the user is prompted of whether to play the song resources. If the user chooses to play, Eason Chan's song resources are played to the user.

The subsequent feedback item involved in the embodiment of the present disclosure may include but not limited to text, audio, video, image, link, and a control event of an application or user equipment.

In addition, there may exist transition wording between the preceding feedback item and the subsequent feedback item returned to the user. The transition wording may act as a transition between two consecutive feedback items. The transition wording may be some universal words such as "next", "then" and "next feedback item".

The transition wording may also be blank, i.e., it is blank between the preceding feedback item and the subsequent feedback item.

The transition wording may also be some symbols. This case is well adapted for devices having a screen such as a mobile phone and smart TV set, for example. "~~~~~~~~~~" may be employed between the two consecutive feedback items for separation.

The transition wording may also be some shadow. This case is adapted for any type of user equipment. Certain shadow is generated through a light source such as an LED on the device. For example, the LED may be used between the two consecutive feedback items to generate a light ring of a certain color, to separate the two consecutive feedback items.

The transition wording may also be some audio. This case is adapted for a device having a loudspeaker such as a mobile phone, a smart loudspeaker box, and a smart TV set. For example, a short audio such as "tinkle" may be employed between the two consecutive feedback items for separation.

The above describes the method according to the present disclosure in detail. A subject for performing the above method may be a processing device for intelligent interaction. The device may be located at an application of the user equipment, or may be a function unit such as a plug-in or Software Development Kit (SDK) in the application located in the user equipment. This is not particularly limited in the embodiment of the present disclosure. An apparatus according to the present disclosure will be described in detail in conjunction with an embodiment.

Figure 2:
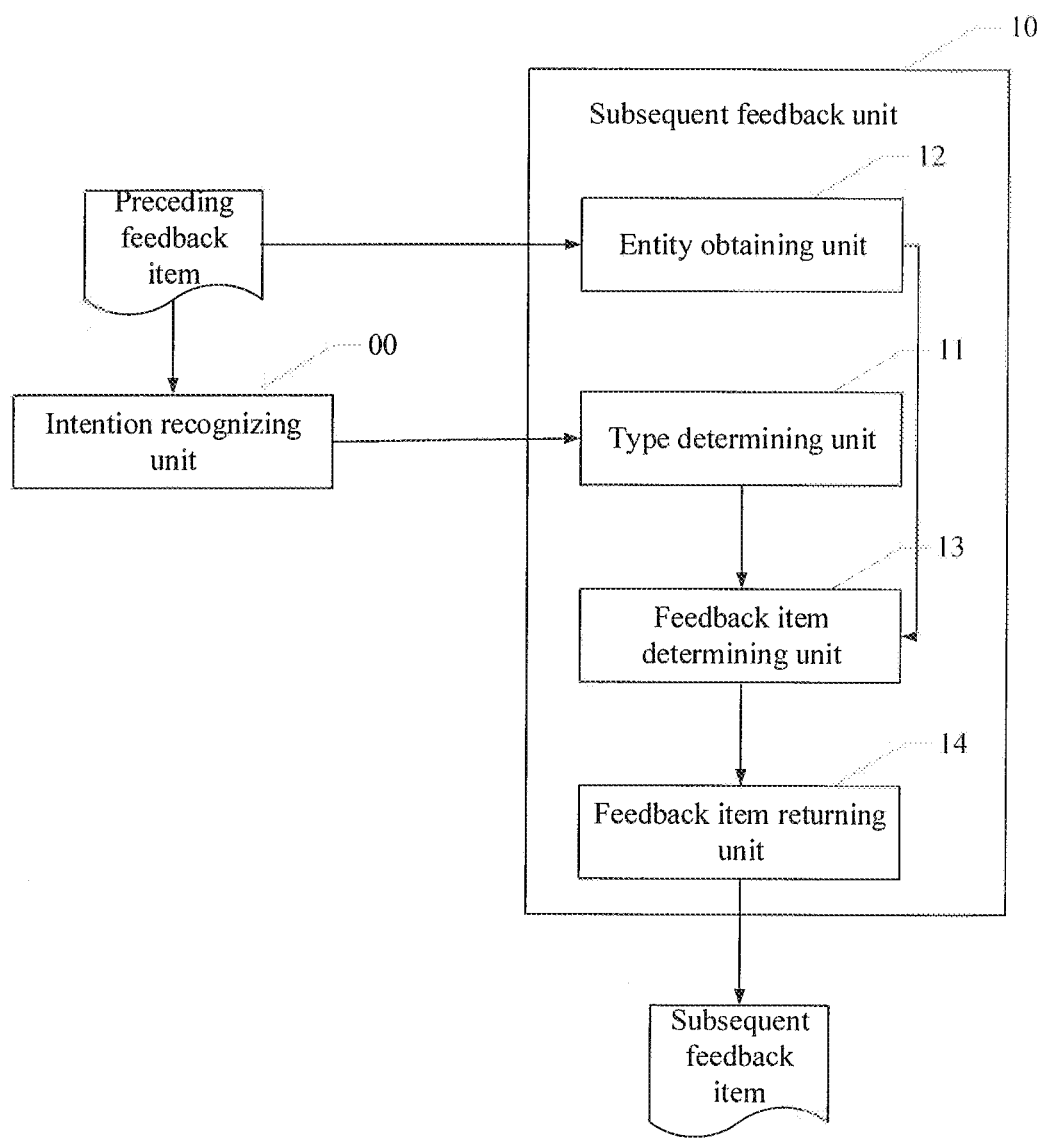
FIG. 2 is a structural diagram of an apparatus according to an embodiment of the present disclosure.

FIG. 2 is a structural diagram of an apparatus according to an embodiment of the present disclosure. The apparatus may be disposed in a smart assistant-type application. As shown in FIG. 2, the apparatus may comprise: an intention recognizing unit 00 and a subsequent feedback unit 10. Main functions of the units are as follows:

The intention recognizing unit 00 is configured to perform intention recognition for a preceding feedback item already returned to the user.

The preceding feedback item already returned to the user may be the latest feedback item already returned to the user, or may be all feedback items already returned to the user based on the user's certain query. In the former case, it is feasible to perform intention recognition for the latest feedback item already returned to the user. In the latter case, it is feasible to perform overall intention recognition for all feedback items already returned to the user.

Specifically, the intention recognizing unit 00 may perform intention recognition for the preceding feedback item already returned to the user in the following manners, but not limited to the following manners:

The first manner: extracting a keyword from the preceding feedback item, and determining an intention of the preceding feedback item according to the keyword.

In this manner, it is possible to preset keywords corresponding to various intention types. It is possible, after obtaining the keyword from the preceding feedback item, determine the intention of the preceding feedback item based on the keyword, wherein one intention type may correspond to one or more keywords.

The second manner: performing semantic analysis for the preceding feedback item, and determining the intention of the preceding feedback item.

It is feasible to predefine a correspondence relationship between semantics and intention, and after performing semantic analysis for the preceding feedback item, determine an intention corresponding to the semantics as the intention of the preceding feedback item. The present embodiment of the present disclosure does not limit a specific manner of performing semantic analysis.

The third manner: matching the preceding feedback item with a preset template, and determining an intention corresponding to the matched template as the intention of the preceding feedback item.

The fourth manner: using a machine learning model obtained by pre-training to perform intention analysis for the preceding feedback item to obtain an intention of the preceding feedback item.

It is possible to pre-train the machine learning model by regarding feedback items whose intentions are annotated, as training samples. It is feasible to use the machine learning model obtained from training to perform intention analysis for the preceding feedback item to obtain an intention of the preceding feedback item.

The subsequent feedback unit 10 is configured to return the subsequent feedback item to the user based on the intention of the preceding feedback item.

Specifically, the subsequent feedback unit 10 may comprise a type determining unit 11, an entity obtaining unit 12, a feedback item determining unit 13 and a feedback item returning unit 14.

The type determining unit 11 is configured to determine a subsequent feedback item type corresponding to the intention, based on the intention of the preceding feedback item.

Specifically, the type determining unit 11 may determine a subsequent feedback item type corresponding to the recognized intention, according to a correspondence relationship between the preset intention and the type of the subsequent feedback item.

The correspondence relationship between the above intentions and subsequent feedback item types may be preset manually, or preset in the manner of machine learning.

In addition, the type determining unit 11 may determine the type of the subsequent feedback item, in addition to depending on the intention of the preceding feedback item, in conjunction with the type of the preceding feedback item and/or an intention confidence of the preceding feedback item.

For example, the pre-established correspondence relationship may be; the type of the preceding feedback item, and the type of the subsequent feedback item corresponding to the intention. That is to say, the type of the corresponding subsequent feedback item can be determined only when the type and intention of the preceding feedback item are hit simultaneously.

Again for example, the type of the corresponding subsequent feedback item can be determined only when the intention of the preceding feedback item needs to meet a certain confidence requirement. If the confidence is lower, it is impossible to continue to return the subsequent feedback item, namely, it is unnecessary to determine the subsequent feedback item.

In addition, the type determining unit 11 may determine the type of the subsequent feedback item further based on the user's environment information. The environment information may include at least one of system time, user equipment type and user equipment action.

The entity obtaining unit 12 is configured to obtain an entity of the subsequent feedback item.

Specifically, the entity obtaining unit 12 may regard an entity extracted from the preceding feedback item as an entity of the subsequent feedback item; or obtain an entity from user data or user environment information as an entity of the subsequent feedback item.

The feedback item determining unit 13 is configured to use the entity of the subsequent feedback item and the type of the subsequent feedback item to determine the subsequent feedback item.

Manners in which the feedback item determining unit 13 determining the subsequent feedback item may include but not limited to the following two manners:

the first manner: use the entity of the subsequent feedback item and the type of the subsequent feedback item to configure a search item: obtain a vertical search result corresponding to the search item as the subsequent feedback item.

Upon configuring the search item, it is possible to determine a template corresponding to the type of the subsequent feedback item, and fill the entity of the subsequent feedback item into the determined template to obtain the search item.

The second manner: use the entity of the subsequent feedback item and the type of the subsequent feedback item to generate a control instruction; send the control instruction to an application or user equipment corresponding to the type of the subsequent feedback item.

The feedback item returning unit 14 is configured to return the determined subsequent feedback item to the user.

The feedback item returning unit 14 may directly return the determined subsequent feedback item to the user, or determine whether to return the determined subsequent feedback item to the user based on the user's feedback.

The subsequent feedback item involved in the embodiment of the present disclosure may include but not limited to text, audio, video, image, link, and a control event of an application or user equipment.

In addition, the feedback item returning unit 14 may feed back transition wording between the preceding feedback item already returned to the user and the subsequent feedback item returned to the user.

The transition wording may be some universal words such as "next", "then" and "next feedback item".

The transition wording may also be blank, i.e., it is blank between the preceding feedback item and the subsequent feedback item.

The transition wording may also be some symbols. This case is well adapted for devices having a screen such as a mobile phone and smart TV set, for example. "~~~~~~~" may be employed between the two consecutive feedback items for separation.

The transition wording may also be some shadow. This case is adapted for any type of user equipment. Certain shadow is generated through a light source such as an LED on the device. For example, the LED may be used between the two consecutive feedback items to generate a light ring of a certain color, to separate the two consecutive feedback items.

The transition wording may also be some audio. This case is adapted for a device having a loudspeaker such as a mobile phone, a smart loudspeaker box, and a smart TV set. For example, a short audio such as "tinkle" may be employed between the two consecutive feedback items for separation.

Two examples are provided below:

When the user inputs the query "when is the latest match of Manchester United", the smart assistant returns the feedback item "the latest match of Manchester United is at 05:00 Nov. 2, 2017, and the opponent is Arsenal", and this feedback item is regarded as the preceding feedback item. Then, the manner according to the present disclosure is employed to determine that the subsequent feedback item is 【set a reminder of the match at 05:00 Nov. 2, 2017】, and the smart assistant may return to the user whether to set a prompt information of the reminder. If the user chooses to set the prompt information, a control instruction 【set a reminder of the match at 05:00 Nov. 2, 2017】 is generated for a smart alarm clock, thereby creating the reminder. The user needn't manually set the reminder. The present disclosure is obviously more intelligentized and simplifies the user operations.

When the user inputs the query "good morning" via a vehicle-mounted intelligent assistant, the feedback item returned by the smart assistant is 【today's weather】, namely, information about the today's. weather. 【today's weather】 is regarded as the preceding feedback item, the subsequent feedback item 【today's road conditions】 is determined in the manner provided by the present disclosure, and it is possible to automatically obtain that the current time is the time when the user goes to work, and automatically search to obtain information about road conditions from the user's home to the user's company. The user needn't input the query for today's road conditions and manually set a departure and a destination. The present disclosure is obviously more intelligentized and simplifies the user operation.

When the user inputs "Eason Chan" via the mobile phone, the feedback item returned by the smart assistant is "Eason Chan encyclopedia". It is possible to regard the feedback item as the preceding feedback item, determine the subsequent feedback item 【Eason Chan's song】 in the manner provided by the present disclosure, and automatically search to obtain and return Eason Chan's hot song to the user. The user may directly choose to listen to the song, without manually searching for Eason Chan's songs, which is obviously more intelligentized and richer and simplifies the user's operations.

Figure 3:
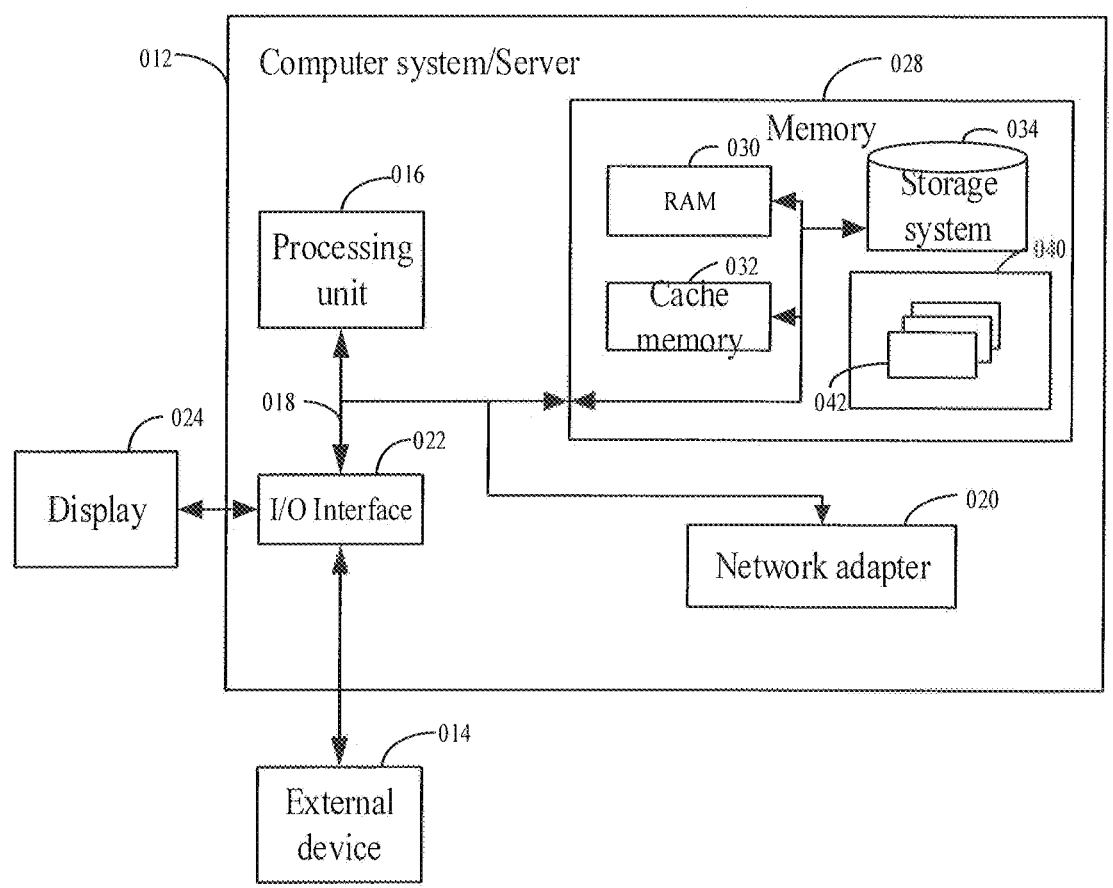
FIG. 3 is a block diagram of a computer system/server 012 adapted to implement an implementation mode of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032, Computer system/server 012 may further include other removable/non-removable, volatile/non-volatile computer system storage media. By way of example only, storage system 034 can be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 3, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the steps of the method according to embodiments of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the steps of the method according to embodiments of the present disclosure are performed by the one or more processors.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A computer-implemented intelligent interaction processing method, wherein the method comprises:
    returning a preceding feedback item to a user based on a query;
    performing intention recognition for the preceding feedback item already returned to the user;
    continuing to return a subsequent feedback item to the user based on the intention of the preceding feedback item, the subsequent feedback item being independent of the query based on which the preceding feedback item returned to the user is generated, and the subsequent feedback item being independent of a follow-up or subsequent query, wherein the subsequent feedback item is returned without receiving a subsequent query,
    wherein the returning a subsequent feedback item to the user based on the intention of the preceding feedback item comprises:
    determining a type of the subsequent feedback item corresponding to the intention;
    obtaining an entity of the subsequent feedback item;
    using the entity of the subsequent feedback item and the type of the subsequent feedback item to determine the subsequent feedback item returned to the user,
    wherein the determining a type of the subsequent feedback item corresponding to the intention comprises:
    determining the type of the subsequent feedback item corresponding to the recognized intention, according to the preset correspondence relationship between the intentions and the type of the subsequent feedback item, the subsequent feedback item comprising text, audio, video, image, link, and a control event of an application or user equipment.

2. The method according to claim 1, wherein the performing intention recognition for a preceding feedback item already returned to the user comprises:
    extracting a keyword from the preceding feedback item, and determining an intention of the preceding feedback item according to the keyword; or,
    performing semantic analysis for the preceding feedback item, and determining the intention of the preceding feedback item; or
    matching the preceding feedback item with a preset template, and determining an intention corresponding to the matched template as the intention of the preceding feedback item; or
    using a machine learning model obtained by pre-training to perform intention analysis for the preceding feedback item to obtain an intention of the preceding feedback item.

3. The method according to claim 1, wherein the correspondence relationship further comprises: a type of the preceding feedback item;
    the method further comprises: determining the type of the preceding feedback item already returned to the user;
    the determining a type of a subsequent feedback item corresponding to the recognized intention, according to a correspondence relationship between the preset intention and the type of the subsequent feedback item comprises:
    determining the type of the corresponding subsequent feedback item according to the correspondence relationship between the type of the preceding feedback item and an intention query of the preceding feedback item.

4. The method according to claim 1, wherein before determining type of the subsequent feedback item corresponding to the intention, the method further comprises:
    judging whether an intention confidence of the preceding feedback item satisfies a preset confidence requirement, and if yes, continuing to execute of the determination of the type of the subsequent feedback item corresponding to the intention.

5. The method according to claim 1, wherein the type of the subsequent feedback item corresponding to the recognized intention is determined further based on the user's environment information.

6. The method according to claim 5, wherein the user's environment information comprises at least one of system time, user equipment type and user equipment action.

7. The method according to claim 1, wherein the obtaining the entity of the subsequent feedback item comprises:
    regarding an entity extracted from the preceding feedback item as an entity of the subsequent feedback item; or
    obtaining an entity from user data or user environment information as an entity of the subsequent feedback item.

8. The method according to claim 1, wherein the using the entity of the subsequent feedback item and the type of the subsequent feedback item to determine the subsequent feedback item comprises:
    using the entity of the subsequent feedback item and the type of the subsequent feedback item to configure a search item;
    obtaining a vertical search result corresponding to the search item as the subsequent feedback item.

9. The method according to claim 8, wherein the using the entity of the subsequent feedback item and the type of the subsequent feedback item to configure a search item comprises:
    determining a template corresponding to the type of the subsequent feedback item;
    filling the entity of the subsequent feedback item into the determined template to obtain the search item.

10. The method according to claim 1, wherein the using the entity of the subsequent feedback item and the type of the subsequent feedback item to determine the subsequent feedback item comprises:
    using the entity of the subsequent feedback item and the type of the subsequent feedback item to generate a control instruction;
    sending the control instruction to an application or user equipment corresponding to the type of the subsequent feedback item.

11. The method according to claim 1, wherein the returning the subsequent feedback item to the user comprises:
    directly returning the determined subsequent feedback item to the user; or
    determining whether to return the determined subsequent feedback item to the user based on the user's feedback.

12. The method according to claim 1, wherein transition wording is returned between the preceding feedback item already returned to the user and the subsequent feedback item returned to the user;

the transition wording comprises a general-purpose word or sentence, blank, symbol, shadow or audio.

13. The method according to claim 1, wherein the subsequent feedback item comprises text, audio, video, image, link, and a control event of an application or user equipment.

14. A device, wherein the device comprises:
one or more processors;
a storage for storing one or more programs,
when said one or more programs are executed by said one or more processors, said one or more processors are enabled to implement an intelligent interaction processing method, wherein the method comprises:
returning a preceding feedback item to a user based on a query;
performing intention recognition for the preceding feedback item already returned to the user;
continuing to return a subsequent feedback item to the user based on the intention of the preceding feedback item, the subsequent feedback item being independent of the query based on which the preceding feedback item returned to the user is generated, and the subsequent feedback item being independent of a follow-up or subsequent query, wherein the subsequent feedback item is returned without receiving a subsequent query,
wherein the returning a subsequent feedback item to the user based on the intention of the preceding feedback item comprises:
determining a type of the subsequent feedback item corresponding to the intention;
obtaining an entity of the subsequent feedback item;
using the entity of the subsequent feedback item and the type of the subsequent feedback item to determine the subsequent feedback item returned to the user,
wherein the determining a type of the subsequent feedback item corresponding to the intention comprises:
determining the type of the subsequent feedback item corresponding to the recognized intention, according to the preset correspondence relationship between the intentions and the type of the subsequent feedback item, the subsequent feedback item comprising text, audio, video, image, link, and a control event of an application or user equipment.

15. The device according to claim 14, wherein the performing intention recognition for a preceding feedback item already returned to the user comprises:

extracting a keyword from the preceding feedback item, and determining an intention of the preceding feedback item according to the keyword; or,
performing semantic analysis for the preceding feedback item, and determining the intention of the preceding feedback item; or
matching the preceding feedback item with a preset template, and determining an intention corresponding to the matched template as the intention of the preceding feedback item; or
using a machine learning model obtained by pre-training to perform intention analysis for the preceding feedback item to obtain an intention of the preceding feedback item.

16. A non-transitory storage medium containing computer executable instructions, wherein the computer executable instructions, when executed by a computer processor, implement an intelligent interaction processing method, wherein the method comprises:

returning a preceding feedback item to a user based on a query;
performing intention recognition for the preceding feedback item already returned to the user;
continuing to return a subsequent feedback item to the user based on the intention of the preceding feedback item, the subsequent feedback item being independent of the query based on which the preceding feedback item returned to the user is generated, and the subsequent feedback item being independent of a follow-up or subsequent query, wherein the subsequent feedback item is returned without receiving a subsequent query,
wherein the returning a subsequent feedback item to the user based on the intention of the preceding feedback item comprises:
determining a type of the subsequent feedback item corresponding to the intention;
obtaining an entity of the subsequent feedback item;
using the entity of the subsequent feedback item and the type of the subsequent feedback item to determine the subsequent feedback item returned to the user,
wherein the determining a type of the subsequent feedback item corresponding to the intention comprises:
determining the type of the subsequent feedback item corresponding to the recognized intention, according to the preset correspondence relationship between the intentions and the type of the subsequent feedback item, the subsequent feedback item comprising text, audio, video, image, link, and a control event of an application or user equipment.

* * * * *